Jan. 25, 1927.  1,615,734
G. ALFISI
FRUIT AND VEGETABLE SQUEEZER
Filed Nov. 14, 1925    2 Sheets-Sheet 1

WITNESSES
H. T. Walker
A. L. Kitchin

INVENTOR
Giuseppe Alfisi
BY Munn & Co.
ATTORNEYS

Jan. 25, 1927.  1,615,734
G. ALFISI
FRUIT AND VEGETABLE SQUEEZER
Filed Nov. 14, 1925     2 Sheets-Sheet 2
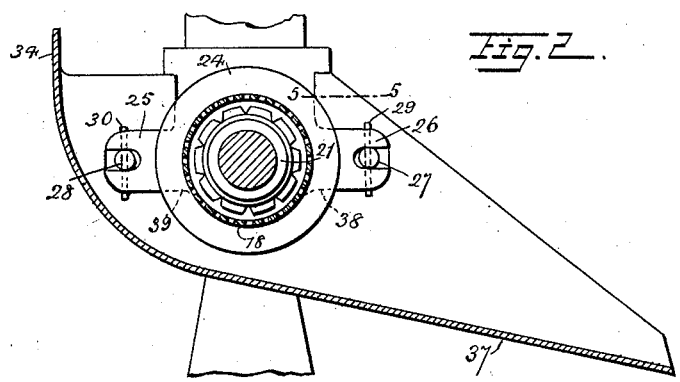
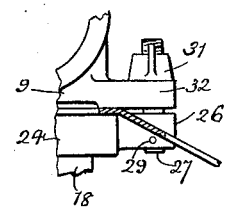
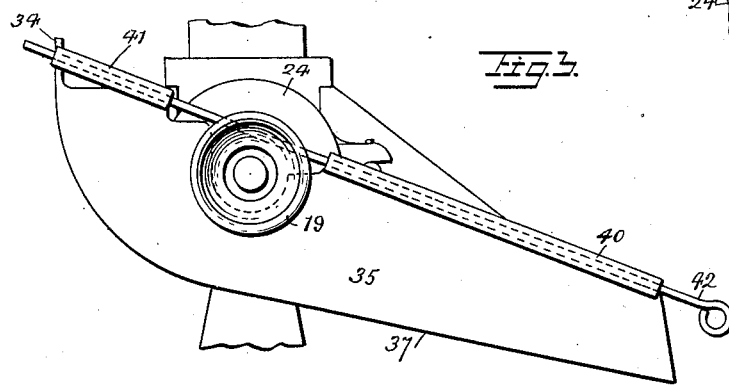
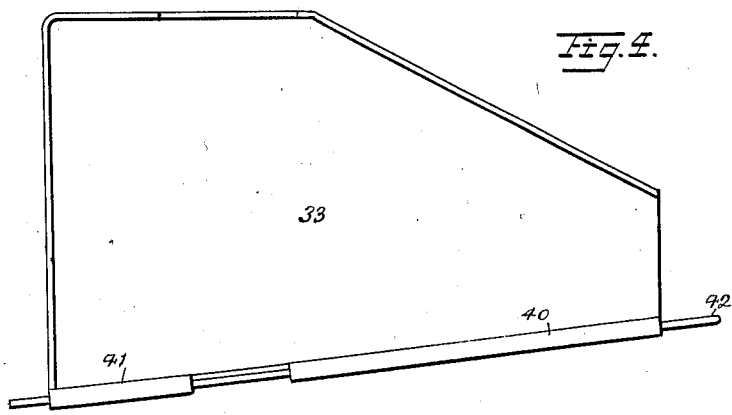
WITNESSES
H. T. Walker
A. L. Kitchin
INVENTOR
Giuseppe Alfisi
BY
ATTORNEYS Patented Jan. 25, 1927.

1,615,734

UNITED STATES PATENT OFFICE.

GIUSEPPE ALFISI, OF NEW YORK, N. Y.

FRUIT AND VEGETABLE SQUEEZER.

Application filed November 14, 1925. Serial No. 69,167.

This invention relates to fruit and vegetable crushers and squeezers and has for an object to provide an improved construction wherein the fruit and vegetables may be fed in the device in any desired manner without previous preparation and acted on in such a manner that the skins, pits and other hard substances will be discharged out one point and the liquid and soft parts out a second point.

Another object of the invention is to provide a squeezer wherein means are provided which will somewhat shred and break up the fruit or vegetables before they are squeezed for separating the various parts thereof.

A still further object, more specifically, is to provide a squeezer for fruits and vegetables wherein a continuous squeezing operation may be carried on, the structure being arranged with a receiving chute for continually directing the parts of the fruit and vegetables to a desired point.

In the accompanying drawings—

Figure 2 is a sectional view through Figure 1 on line 2—2.

Figure 3 is a fragmentary side view of the center part of the structure shown in Figure 1, illustrating the construction and location of the discharge chute and the end of a squeezing cylinder.

Figure 4 is a top plan view of the guiding or discharge chute shown in Figure 2.

Figure 5 is a detail fragmentary sectional view through Figure 2, approximately on line 5—5.

Figure 1:
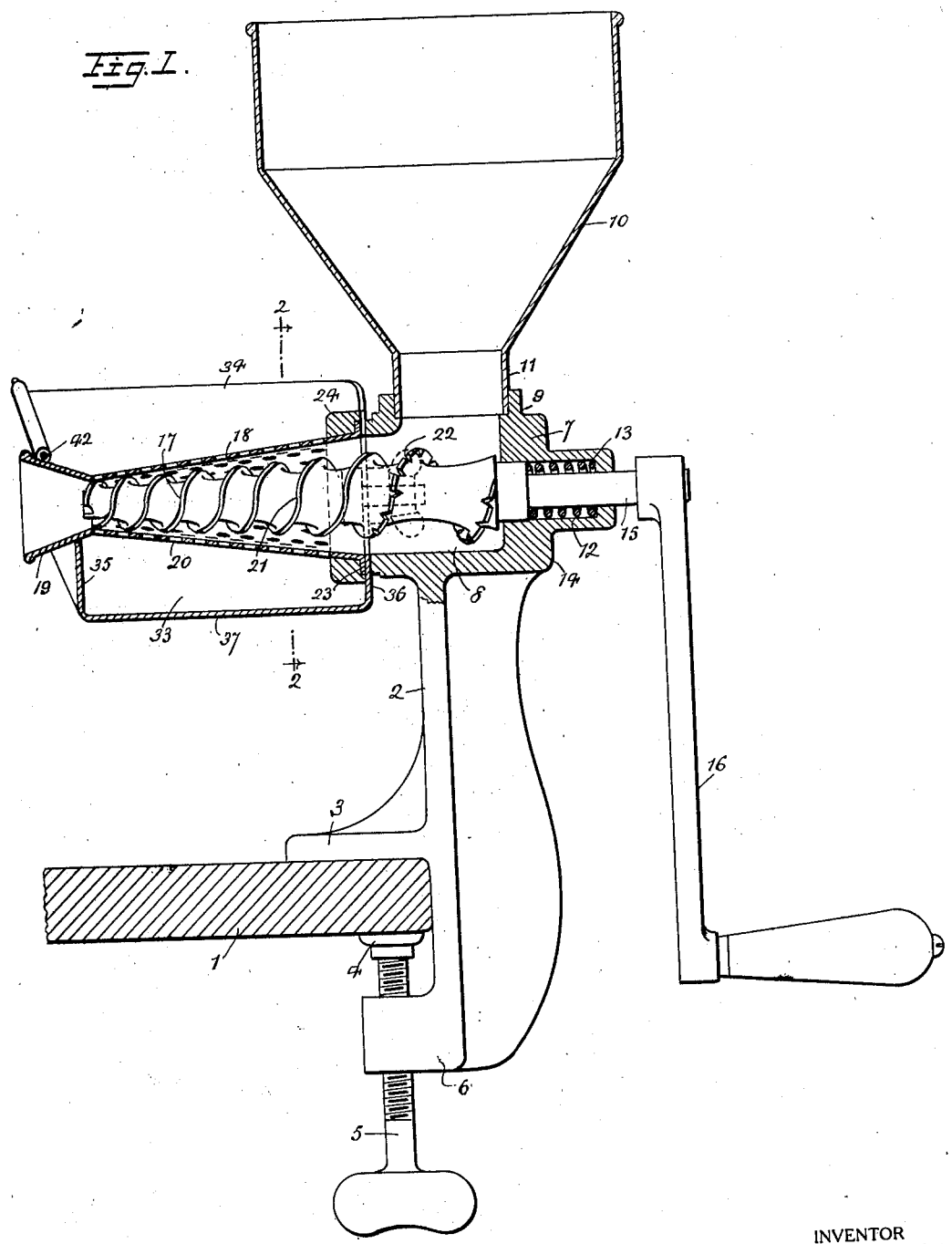
Figure 1 is a view partly in section, disclosing an embodiment of the invention.

Referring to the accompanying drawings by numerals, 1 indicates a table or other support to which the device is adapted to be secured. In order to accomplish this result, the device is provided with a standard 2 having a supporting foot 3 co-acting with the foot 4 and the screw member 5. The screw member 5 is threaded through an extension 6 of the standard 2. The standard 2 merges into what may be called a body 7 having a chamber 8 formed with an upstanding flange 9. A magazine or rather a hopper 10, is arranged above the body 7 and provided with an end or neck 11 fitting snugly within the flange 9 whereby the parts are held together through the action of friction. The body 7 is also provided with a bore 12 in which spring 13 is mounted, said spring acting at one end against part of the body 7 and at the other against an enlargement 14 of the shaft 15. A crank 16 is connected in any suitable manner to the shaft 15 for rotating the same. Also connected to the shaft 15 or formed integral therewith, is a spiral member or screw 17 which tapers from one end to the other. This screw almost fits the foraminous or perforated cylinder 18. It will be noted that cylinder 18 tapers from one end to the other and that the small end of the spiral member 17 has a sliding fit with the small end of the cylinder 18. A discharge or flaring end 19 is provided on member 18, said end 19 acting as a discharge chute for the skins, seeds and other hard substances of the fruit or vegetable crushed. The water and soft parts of the fruit or vegetables pass through the various openings 20 in the cylinder 18.

From Figure 1 it will be noted that the spiral thread 21 of member 17 is notched at the large end for a short distance so as to provide teeth 22 adapted to tear and break up fruit or vegetables fed into the device through the hopper 10. The device is adapted to readily squeeze tomatoes, grapes, apples and other articles. The spring 13 causes the parts to assume substantially the position shown in Figure 1 but permits a yielding action in one direction. The cylinder 18 is provided with an annular flange 23 which is engaged by a clamping ring 24 whereby the flange is clamped to the body 7. The ring 24 is provided with a pair of apertured ears 25 and 26 which accommodate the clamping bolts 27 and 28, said bolts being pivotally connected therewith by pins 29 and 30, and extend through suitable ears 31 formed on the body 7. Suitable nuts 32 are threaded onto the bolts 27 and 28 and act to clamp the parts firmly together. It will be noted that part of the guiding or discharge pan 33 is clamped against the body 7 when ring 24 is clamped in position. In regard to the pan or discharge member 31, it will be noted that the same is provided with an end wall 34 and side walls 35 and 36 merging into a suitable inclined bottom 37. The side wall 36 is provided with a notch substantially of the same size as the chamber 8, said notch being provided with laterally extending portions 38 and 39 whereby the side wall 36 may properly fit over the bolts 27 and 28. The side wall 35 is provided with a suitable cut away portion or notch for accommodating the discharge cone 19. Also the side wall 35 is provided with rolled tubular portions 40 and 41 which accommodate the rod 42, said rod being slidingly mounted in these tubular members and acting to lock the pan or discharge tray 33 in place.

In operation, when it is desired to squeeze some fruit or vegetables, as for instance, tomatoes, a quantity is deposited in the hoppers 10 and the various tomatoes will move down by gravity until they engage the spiral member 17. As this member is rotated by crank 16, the teeth 22 will quickly cut and break up the tomatoes into comparatively small pieces and these pieces will be gradually forced along the foraminous cone 18 until the liquid and soft matter is all forced through member 18 and the skins and hard substances forced out through member 19. It will be noted that the taper of the spirals of member 17 is not as great as the taper of member 18 so that as the pulp moves toward the discharge member 19, a greater and greater squeezing action will be produced. In order to prevent breaking of any of the parts or any undue squeezing action, spring 13 is provided and positioned to permit a limited yielding action while maintaining the proper squeezing force. As all of the matter acted upon is either forced out through the apertures 20 or through the discharge member 19, the device is adapted to operate at a comparatively high rate of speed and, consequently, a large amount of fruit or vegetables may be squeezed in a given time.

When the operation of squeezing has been completed, the pan or discharge member 33 may be readily removed as well as member 18, spiral member 17 and associated parts. This will permit a thorough cleaning and sterilizing of all of the parts. The crank 16 is preferably screwed onto shaft 15 so that it may be readily removed and shaft 15, together with the spiral member 17, disconnected from the body 7.

What I claim is:

In a fruit and vegetable squeezing apparatus, a removably mounted pan for receiving and directing certain of the squeezed material to a discharge point, said pan including a side member having a pair of tubular portions along one edge, and a sliding rod fitted into said tubular member, said rod when engaging both of the tubular members interlocking with part of the squeezing apparatus for holding the pan in operative position.

GIUSEPPE ALFISI.